US012789581B1

(12) United States Patent
Kocak

(10) Patent No.: US 12,789,581 B1
(45) Date of Patent: Nov. 10, 2026

(54) FITTING FOR VEHICLE AIR CONDITIONING SERVICE PORTS

(71) Applicant: Serhat Kocak, Houston, TX (US)

(72) Inventor: Serhat Kocak, Houston, TX (US)

( * ) Notice: Subject to any disclaimer, the term of this patent is extended or adjusted under 35 U.S.C. 154(b) by 56 days.

(21) Appl. No.: 18/764,896

(22) Filed: Jul. 5, 2024

(51) Int. Cl.
*B60H 1/00* (2006.01)

(52) U.S. Cl.
CPC ................................ *B60H 1/00521* (2013.01)

(58) Field of Classification Search
CPC ............ B60H 1/00521; B60H 1/00542; B60H 1/3229; B60H 1/00571; B60Y 2304/01; B60L 58/26; B60K 11/02
See application file for complete search history.

(56) References Cited

U.S. PATENT DOCUMENTS 11,453,267 B2 * 9/2022 Koberstein ........ B60H 1/00907
2023/0102168 A1 * 3/2023 Behnert .................... F28F 3/08 165/42
2023/0339284 A1 * 10/2023 Ye ........................ B60H 1/3229
2024/0167769 A1 * 5/2024 Rhee ........................ F01P 11/04

FOREIGN PATENT DOCUMENTS

CN 215063015 U * 12/2021 ........... B60H 1/3229
JP 7261928 B1 * 4/2023
KR 20210090004 A * 7/2021 ........... B60H 1/3229
KR 20210090814 A * 7/2021 .......... H01M 10/667
KR 102359325 B1 * 2/2022 ........... F16K 31/043
WO WO-2023074682 A1 * 5/2023 ............ F16K 11/085

* cited by examiner

*Primary Examiner* — Frantz F Jules
*Assistant Examiner* — Martha Tadesse
(74) *Attorney, Agent, or Firm* — Plager Schack LLP; Mark H. Plager; Kara K. Verryt

(57) ABSTRACT

A fitting kit for operatively connecting a vehicle's air conditioning service ports to utilize the air conditioning system for performing parts may include a chiller adaptor configured to engage with an existing air conditioning system, a first front adaptor designed to engage with the chiller adaptor with a first hose, and a second front adaptor designed to engage with the chiller adaptor with a second hose.

7 Claims, 4 Drawing Sheets

FITTING FOR VEHICLE AIR CONDITIONING SERVICE PORTS

BACKGROUND

The embodiments herein relate generally to automotive accessories, and more particularly, to a fitting designed to connect to a vehicle's air conditioning service ports to utilize the air conditioning system for performance parts.

Conventionally, the air conditioning system of a vehicle is not easily accessible to utilize in helping keep performance parts at lower air temperatures. Existing systems require many parts and work to tap into the vehicle's air conditioning system. Because of the extensive amount of work required by other systems, the modification is often avoided and, thus, the performance part are not kept at adequate temperatures.

Therefore, what is needed is an easily installed and implemented system for cooling performance parts using a vehicle's air conditioning service ports.

SUMMARY

Some embodiments of the present disclosure include a fitting kit for operatively connecting a vehicle's air conditioning service ports to utilize the air conditioning system for performing parts. The fitting kit may include a chiller adaptor configured to engage with an existing air conditioning system, a first front adaptor designed to engage with the chiller adaptor with a first hose, and a second front adaptor designed to engage with the chiller adaptor with a second hose.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
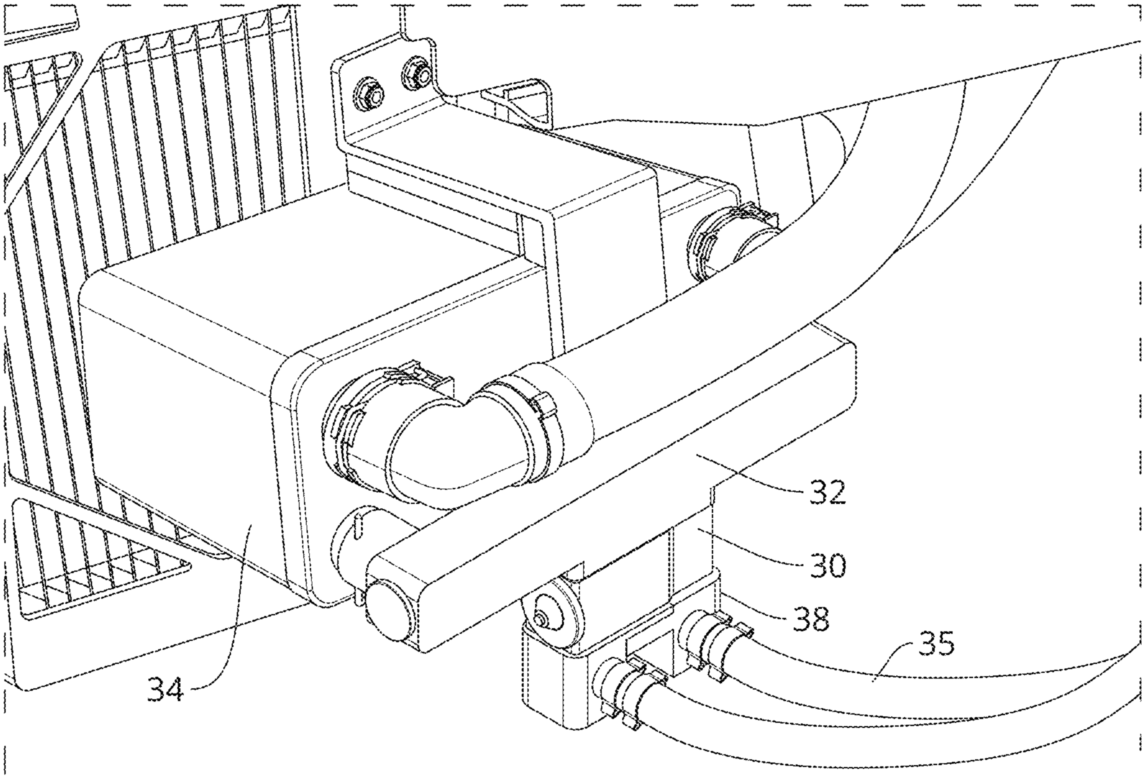
FIG. 1 is a perspective view of one embodiment of the present disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an attachment or fitting for utilizing a vehicle's air conditioning service ports for cooling performance parts and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The elements of the device of the present disclosure may be related in the following exemplary fashion. It is not intended to limit the scope or nature of the relationships between the various elements and the following examples are presented as illustrative examples only.

By way of example, and referring to FIGS. 1-7, some embodiments of the present disclosure include a fitting kit for operatively connecting a vehicle's air conditioning service ports to utilize the air conditioning system for performing parts, the fitting kit comprising a chiller adaptor configured to engage with an existing air conditioning system, the chiller adaptor having a chiller adaptor body with a rear surface, a top surface, a front surface, and a bottom surface, a pair of connection posts extending outward from the rear surface of the chiller adaptor body, and a pair of hose barbs extending outward from a member selected from the group consisting of the top surface, the front surface, and the bottom surface; a first front adaptor 10 including a first adaptor body having a first rear surface, a first top surface, a first bottom surface, and a first side surface, wherein a first adaptor hose barb 12 extends outward from the first rear surface and is configured to operatively attach to a first hose barb of the pair of hose barbs using a first hose 35; and a second front adaptor 18 including a second adaptor body having a second rear surface, a second top surface, a second bottom surface, and a second side surface, wherein a second adaptor hose barb 20 extends outward from the second rear surface and is configured to operatively attach to a second hose barb of the pair of hose barbs using a second hose 35. The first front adaptor 10 and the second front adaptor 18 may be designed to also operatively engage with existing service equipment to easily service the vehicle's air conditioning system.

As mentioned above, and as shown in the Figures, the fitting kit is configured to engage with and utilize the existing air conditioning system in a vehicle, wherein the air conditioning system may include a chiller 34, a chiller manifold 32 attached to the chiller 34, and an evaporator 34 attached to the chiller manifold 32, wherein the evaporator 34 includes a pair of service ports, and wherein the pair of connection posts extending from the chiller adaptor are sized to fit within the pair of service ports in the evaporator 34, thus engaging the chiller adaptor with the evaporator 30 and, therefore, with the air conditioning system.

Figure 2:
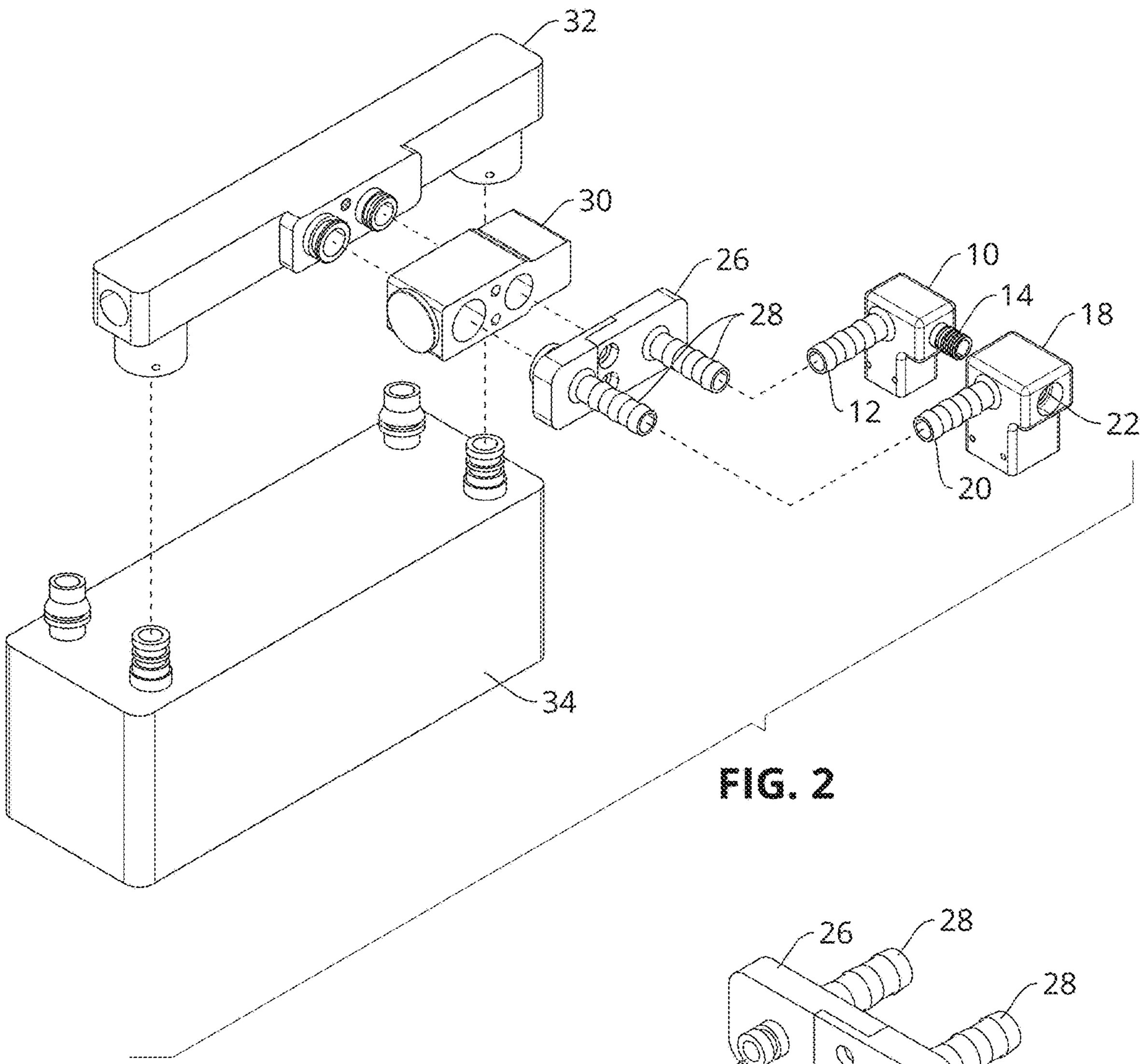
FIG. 2 is an exploded view of one embodiment of the present disclosure.
Figure 3:
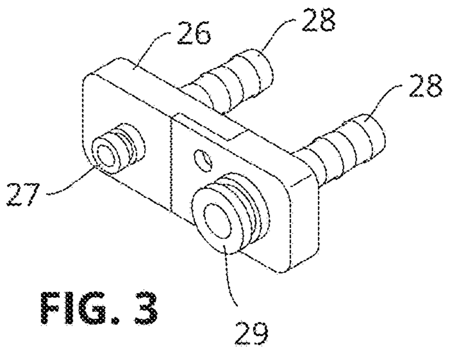
FIG. 3 is a bottom perspective view of one embodiment of the present disclosure.

As described above, the chiller adaptor may comprise a chiller adaptor body with a rear surface, a top surface, a front surface, and a bottom surface, a pair of connection posts extending outward from the rear surface of the chiller adaptor body, and a pair of hose barbs extending outward from a member selected from the group consisting of the top surface, the front surface, and the bottom surface. The chiller adaptor body may have a channel extending therethrough from the connection posts to the hose barbs such that a fluid or gas may flow through the chiller adaptor body. Depending on the vehicle into which the fitting kit is being installed, the shape and orientation of the chiller adaptor may vary. For example, as shown in FIGS. 2 and 3, the chiller adaptor may be a straight adaptor 26, wherein the adaptor body is a substantially planar block, wherein a first evaporator connection post 27 extending from a first portion of the rear surface of the adaptor body and a second evaporator connection post 29 extends from a second portion of the rear surface of the adaptor body, wherein the first evaporator connection post 27 and the second evaporator connection post 29 are configured to engage with first and second service ports, respectively, on the evaporator 30, as indicated in FIG. 2. The straight adaptor 26 may also comprise straight adaptor hose barbs 28 extending substantially perpendicularly outward from the front surface of adaptor body, wherein the front surface is opposite the rear surface. A channel (not shown) may extend through the adaptor body such that the connection posts are in fluid communication with the hose barbs 28. As shown in the Figure, the straight adaptor 26 may be made from two smaller blocks attached together to form the substantially planar straight adaptor body.

Figure 5:
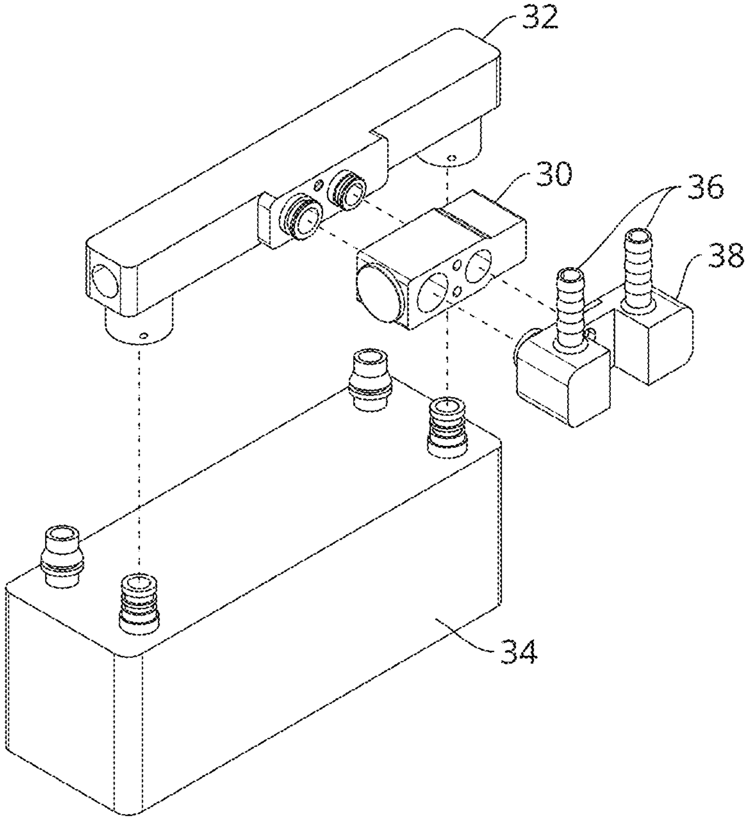
FIG. 5 is an exploded view of one embodiment of the present disclosure.
Figure 6:
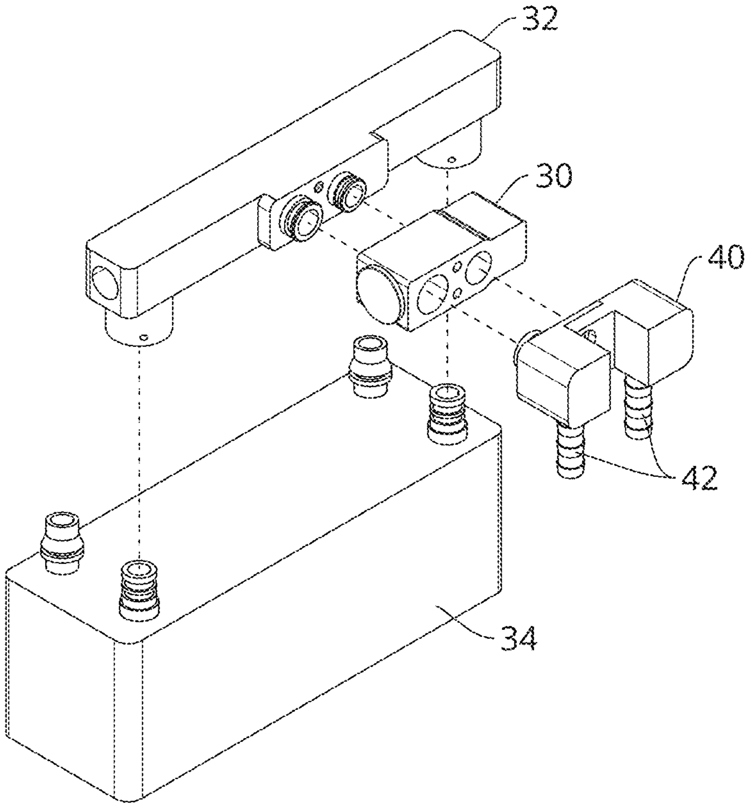
FIG. 6 is an exploded view of one embodiment of the present disclosure.
Figure 7:
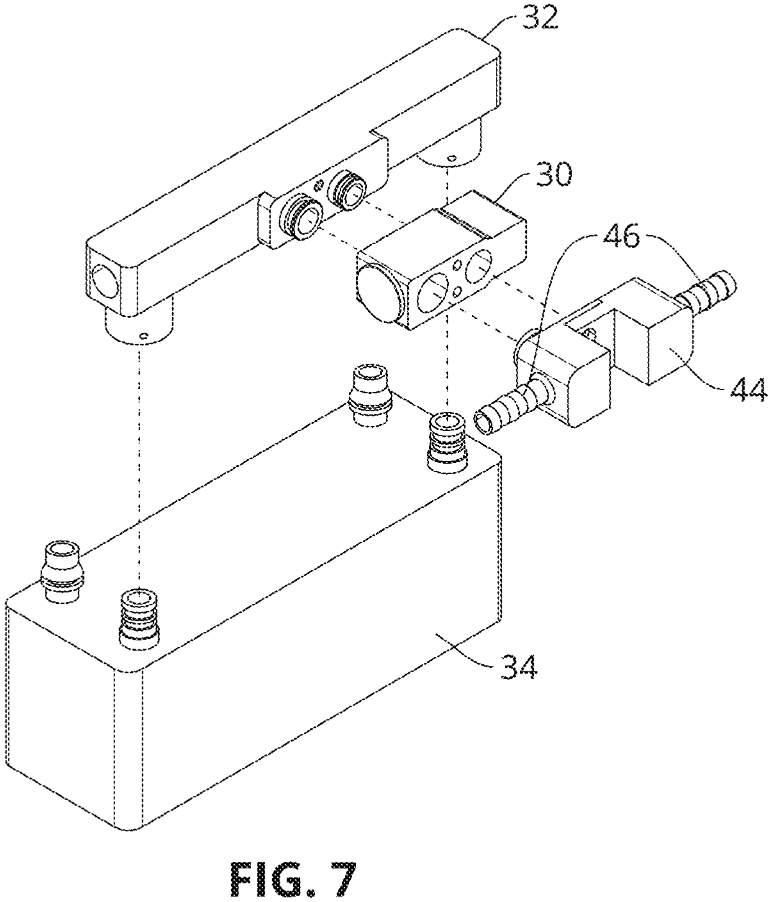
FIG. 7 is an exploded view of one embodiment of the present disclosure.

Alternatively, and depending on the needs defined by the vehicle into which the fitting kit is being installed, the hose barbs may extend outward from a different surface of the adaptor body. For example, as shown in FIG. 5, the chiller adaptor may be an up connector adaptor 38, wherein the up connector hose barbs 36 may extend outward from a top surface of the up connector adaptor body. In such case, the up adaptor 38 may have a larger depth to accommodate attachment of the up connector hose barbs 36 to the top surface thereof. For example, and as shown in FIG. 5, the up connector adaptor 38 may be made from a pair of blocks connected via tabs, wherein a first of the up connector hose barbs 36 extends upward from a first block portion and a second of the up connector hose barbs 36 extends upward from a second block portion. However, the chiller connection posts may still extend outward from the rear surface of the adaptor body. Therefore, the interior channel (again, not shown) may be an L-shaped channel to allow the chiller connection post to be in fluid communication with the respective up connector hose barb 36. In a yet further embodiment, and as shown in FIG. 6, the chiller adaptor may be a down connector adaptor 40, wherein the down connector hose barbs 42 extend out of the bottom surface of the adaptor body. Again, the interior channel (not shown) may be substantially L-shaped such that the connection posts are in fluid communication with the down connector hose barbs 42. In another embodiment, and as shown in FIG. 7, the chiller adaptor may comprise a side connector 44, wherein the side connector hose barbs 46 extend out of respective side surfaces of the adaptor body. Again, the interior channel (not shown) may be substantially L-shaped, such that the connection posts are in fluid communication with the side connector hose barbs 46.

While not shown in the Figures, it is envisioned that various other arrangements of chiller adaptors may exist, wherein the adaptor body may be shaped to fit within the desired vehicle and wherein the basic structure of the adaptor body includes a rear surface with the connection post to engage with the evaporator 30 and a hose barb extending out of another surface thereof. The shape of the adaptor body and the placement of the hose barb may vary, as needed, without impacting the functionality of the chiller adaptor.

As described above, the chiller adaptor may include a pair of hose barbs extending therefrom, wherein the hose barbs are sized to engage with a hose 35, such as a high-pressure refrigerant hose. As such, the barbs may be ribbed to prevent accidental disengagement of the hose 35 and the barb during use of the fitting kit of the present disclosure.

Figure 4:
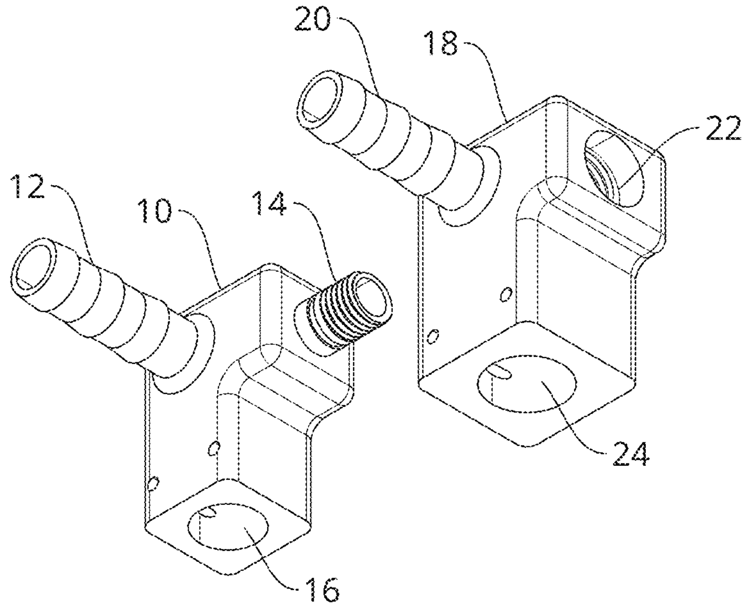
FIG. 4 is an exploded view of one embodiment of the present disclosure.

As explained above, the fitting fit may also comprise a first front adaptor 10 and a second front adaptor 18 engaged with the pair of hose barbs extending from the chiller adaptor via a hose 35, wherein the first front adaptor 10 and the second front adaptor 18 are configured to engage with service equipment to easily service the vehicle's air conditioning system. As shown in FIG. 4, the first front adaptor 10 may comprise a first adaptor body with a front surface, a rear surface, a bottom surface, a top surface, and a side surface, wherein a first adaptor hose barb 12 may extend outward from the rear surface thereof, the first adaptor hose barb 12 being sized to engage with the hose 35. A first adaptor service port 16 may extend into the bottom surface thereof and a first adaptor threaded peg 14 may extend outward from a side surface thereof, wherein the first adaptor service port 16 is configured to engage with service equipment and the first adaptor threaded peg 14 is configured to engage with service equipment. In some embodiments, such as that shown in FIG. 4, the first front adaptor body may be substantially L-shaped and may include an internal channel (not shown), wherein the channel extends such through the front adaptor body such that the first adaptor hose barb 12, the first adaptor service port 16, and the first adaptor threaded peg 14 are all in fluid communication. The second front adaptor 18 may have a structure similar to that of the first front adaptor 10, wherein the second front adaptor 18 comprises a second adaptor body with a front surface, a rear surface, bottom surface, a top surface, and a side surface, wherein a second adaptor hose barb 20 may extend outward from the rear surface thereof, the first adaptor hose bar 20 being sized to engage with the hose 35. A second adaptor service port 24 may extend into the bottom surface therefore, and a second adaptor threaded port 22 may extend into a side surface thereof, wherein the second adaptor service port 24 may be sized to engage with a service hose, and the second adaptor threaded port 22 may be sized to accommodate insertion of a service hose therein. Like the first front adaptor 10, the second front adaptor 18 may have a substantially L-shaped body with a channel extending therethrough, the channel allowing each of the second adaptor service port 24, the second adaptor hose barb 20, and the second adaptor threaded port 22 to be in fluid communication with one another.

As mentioned above, the fitting kit of the present disclosure may be used for utilizing a vehicle's air conditioning service ports for cooling performance parts. To use the fitting kit, the chiller adaptor may be engaged with the evaporator 30 by inserting the evaporator connection posts 27, 29 with the ports on the evaporator 30. A first hose 35 may then be attached to a first adaptor barb, wherein a second end of the hose 35 may be attached to the first adaptor hose barb 12 on the first front adaptor 10. A second hose 35 may then be attached to a second adaptor barb, wherein the second end of the hose 35 may be attached to the second adaptor hose barb 20 on the second front adaptor 18. The first front adaptor 10 and the second front adaptor 18 may then be operatively connected to service equipment for servicing the air conditioning system. As such, cool air may flow from the chiller 34 to the performance parts.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A fitting kit for operatively connecting a vehicle's air conditioning service ports to utilize an air conditioning system for performing parts, the fitting kit comprising:

- a chiller adaptor configured to engage with an existing air conditioning system, the chiller adaptor comprising:
- a chiller adaptor body with a rear surface, a top surface, a front surface, and a bottom surface;
- a pair of connection posts extending outward from the rear surface of the chiller adaptor body; and
- a pair of hose barbs extending outward from a member selected from the group consisting of the top surface, the front surface, and the bottom surface;
- a first front adaptor comprising:
  - a first adaptor body having a first rear surface, a first top surface, a first bottom surface, and a first side surface; and
  - a first adaptor hose barb extending outward from the first rear surface,
  - wherein the first adaptor hose barb is configured to operatively attach to a first hose barb of the pair of hose barbs using a first hose; and
- a second front adaptor comprising:
  - a second adaptor body having a second rear surface, a second top surface, a second bottom surface, and a second side surface; and
  - a second adaptor hose barb extending outward from the second rear surface,
  - wherein the second adaptor hose barb is configured to operatively attach to a second hose barb of the pair of hose barbs using a second hose.

2. The fitting kit of claim 1, wherein the chiller adaptor further comprises a pair of channels extending therethrough, each channel of the pair of channels extending between a connection post of the pair of connection posts and a respective hose barb of the pair of hose barbs.

3. The fitting kit of claim 1, wherein:

- the chiller adaptor is a straight adaptor;
- the adaptor body is a substantially planar block;
- a first connection post of the pair of connection posts extends from a first portion of the rear surface of the adaptor body; and
- a second connection post of the pair of connections posts extends from a second portion of the rear surface of the adaptor body.

4. The fitting kit of claim 3, wherein the first adaptor hose barb and the second adaptor hose barb each extend substantially perpendicularly outward from the front surface of adaptor body.

5. The fitting kit of claim 1, wherein:

- the chiller adaptor is an up connector with an up connector adaptor body;
- up connector hose barbs extend outward from a top surface of the up connector adaptor body;
- the up connector adaptor body comprises a first block portion and a second block portion connected via tabs;
- a first of the up connector hose barbs extends upward from the first block portion; and
- a second of the up connector hose barbs extends upward from the second block portion.

6. The fitting kit of claim 1, wherein

- the first front adaptor further comprises:
  - a first adaptor service port extending into the bottom surface thereof; and
  - a first adaptor threaded peg extending outward from the first side surface thereof; and
- the second front adaptor further comprises:
  - a second adaptor service port extending into the bottom surface thereof; and
  - a second adaptor threaded port extending into the second side surface thereof.

7. The fitting kit of claim 6, wherein:

- the first front adaptor body is substantially L-shaped; and
- the second front adaptor body is substantially L-shaped.

* * * * *